(12) United States Patent
Rothschild

(10) Patent No.: US 9,044,867 B2
(45) Date of Patent: **\*Jun. 2, 2015**

(54) AUTONOMOUS RECHARGEABLE HEATED CHILD'S MAT

(71) Applicant: Michael Benn Rothschild, London (GB)

(72) Inventor: Michael Benn Rothschild, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/693,811

(22) Filed: Dec. 4, 2012

(65) Prior Publication Data

US 2014/0231410 A1 Aug. 21, 2014

(51) Int. Cl.
| | |
|---|---|
| H02J 1/00 | (2006.01) |
| B26B 9/00 | (2006.01) |
| H04B 3/54 | (2006.01) |
| H01M 2/10 | (2006.01) |
| H01M 10/42 | (2006.01) |
| H05B 1/02 | (2006.01) |
| H05B 3/34 | (2006.01) |
| H01M 4/58 | (2010.01) |
| H01M 10/0525 | (2010.01) |
| H01M 10/30 | (2006.01) |
| H01M 10/34 | (2006.01) |

(52) U.S. Cl.
CPC ............ *B26B 9/00* (2013.01); *H04B 3/542* (2013.01); *H02J 1/00* (2013.01); *H01M 2/1022* (2013.01); *H01M 4/5825* (2013.01); *H01M 10/0525* (2013.01); *H01M 10/30* (2013.01); *H01M 10/345* (2013.01); *H01M 10/425* (2013.01); *H05B 1/0238* (2013.01); *H05B 1/025* (2013.01); *H05B 3/342* (2013.01); *H05B 2203/003* (2013.01); *H05B 2203/005* (2013.01); *H05B 2203/037* (2013.01)

(58) Field of Classification Search
CPC .............. H05B 1/0272; H05B 1/0236; H05B 2203/017
USPC ......... 219/528, 529, 510, 217, 483, 486, 537, 219/539
See application file for complete search history.

(56) References Cited

U.S. PATENT DOCUMENTS

| | | | |
|---|---|---|---|
| 4,661,689 A | | 4/1987 | Harrison |
| 5,897,162 A | * | 4/1999 | Humes et al. ............ 297/180.12 |
| 5,948,303 A | * | 9/1999 | Larson .......................... 219/486 |
| 6,127,655 A | * | 10/2000 | Humes et al. ................. 219/217 |
| 6,163,907 A | * | 12/2000 | Larson .............................. 5/691 |

(Continued)

FOREIGN PATENT DOCUMENTS

| | | |
|---|---|---|
| WO | WO02/085685 A1 | 10/2002 |
| WO | WO2010/107724 A1 | 9/2010 |

*Primary Examiner* — Tu B Hoang
*Assistant Examiner* — Jimmy Chou

(57) ABSTRACT

The Autonomous Rechargeable Heated Child's Mat is totally portable and forms an integrated yet detachable part of the child's pushchair, buggy or pram (or similar conveyance). Rechargeable embedded power cells power the system for over 4 hours at a full heat output. The system is fully controllable from the parent or operator's mobile telephone or tablet device via bidirectional wireless communication. Simply seat or lay the child in the pushchair, buggy or pram (or similar conveyance) as normal. Using a dedicated application on the mobile device the child will quickly and safely be warmed to a controlled temperature as set by the parent or operator. The longest of excursions can now be made with the child in complete comfort and warmth. A powerful, intelligent and safe mobile heating system that is simple to operate and control wirelessly with simplicity.

9 Claims, 13 Drawing Sheets

(56) References Cited

U.S. PATENT DOCUMENTS

| | | | |
|---|---|---|---|
| 6,730,887 B2* | 5/2004 | Horey et al. | 219/497 |
| 6,768,086 B2* | 7/2004 | Sullivan et al. | 219/494 |
| 6,855,158 B2* | 2/2005 | Stolpmann | 607/108 |
| 6,943,320 B1* | 9/2005 | Bavett | 219/213 |
| 7,034,251 B1* | 4/2006 | Child et al. | 219/212 |
| 7,189,944 B2* | 3/2007 | Child et al. | 219/212 |
| 7,439,474 B2* | 10/2008 | Huang | 219/549 |
| 7,469,500 B2* | 12/2008 | Lovelace | 43/132.1 |
| 7,477,969 B2* | 1/2009 | Panic | 701/36 |
| 8,324,533 B2* | 12/2012 | Lee | 219/212 |
| 2004/0026405 A1* | 2/2004 | Alvite et al. | 219/486 |
| 2005/0103773 A1* | 5/2005 | Diemer et al. | 219/528 |
| 2006/0151475 A1* | 7/2006 | Horvath et al. | 219/529 |
| 2006/0261055 A1* | 11/2006 | Child et al. | 219/212 |
| 2006/0261057 A1* | 11/2006 | Horvath et al. | 219/529 |
| 2006/0289421 A1* | 12/2006 | Axinte et al. | 219/217 |
| 2009/0107984 A1* | 4/2009 | Kohn | 219/528 |
| 2009/0114633 A1* | 5/2009 | Naylor et al. | 219/213 |
| 2009/0134145 A1* | 5/2009 | Rock et al. | 219/528 |
| 2012/0049586 A1* | 3/2012 | Yoshimoto et al. | 297/180.12 |
| 2012/0234815 A1* | 9/2012 | Willey et al. | 219/202 |
| 2012/0273475 A1* | 11/2012 | An | 219/217 |

* cited by examiner

Power Transfer Lead

Bidirectional data transfer via WiFi® or Bluetooth® with the
Embedded Wireless Microcontroller Controller in the Power Pack Controller Module

AUTONOMOUS RECHARGEABLE HEATED CHILD'S MAT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

Currently, to keep a child warm in a pushchair, buggy or pram (or similar conveyance) the child must be dressed in a number of clothing layers and wrapped in blankets or place in a sleeping bag. These methods of keeping a child warm are somewhat primitive and are not always practical or efficient. The child has to be partially undressed if they are taken from an extremely cold environment (outside on a winter's day) to a suddenly warm environment like the inside a large shop or store. The child may be sleeping and the process of removing some clothes often disturbs them and/or wakes them. In summation the present system is not only ineffective, but often troublesome for both the child and the adult looking after the infant.

The present invention aims to solve at least some of the above problems.

BRIEF SUMMARY OF THE INVENTION

In an attempt to overcome some of the above limitations, the present invention offers a complete mobile autonomous rechargeable heating solution. The Autonomous Rechargeable Heated child's Mat is totally portable and forms an integrated yet detachable part of the child's pushchair, buggy or pram (or similar conveyance). Rechargeable power cells power the system with a life expectancy in excess of eight years. The system is fully controllable from the parent/guardian's mobile telephone or tablet device via wireless communication. Simply seat or lay the child in the pushchair or buggy (or similar conveyance) as normal. Using a dedicated application on the mobile device the child will quickly and safely be warmed to a safe and controlled temperature as set by the parent/guardian. The system will continue to control and monitor heat levels without any further intervention. The system automatically detects if the child is taken into a warmer environment, such as inside a warm shop and instantly the system will reduce it's heating output to maintain a safe and comfortable temperature as set. The longest of excursions and shopping trips can now be made with the child in complete comfort and warmth. The system automatically reports any problems or anomalies in real time should they occur. A powerful and intelligent heating system that is simple to operate and control with simplicity.

The present invention is controlled wirelessly either from the parent's/operator's mobile telephone or laptop/pc/tablet/iPad® via WiFi® or Bluetooth® connection using either a web browser or the specifically written control application (Mobile App.) The parent/operator does not have the extra weight and inconvenience of using a separate device to control the heating output of the invention; the mobile telephone or laptop/pc/tablet/iPad® can be utilised, which is often being carried anyway and thus avoids extra weight and complications.

The following description details a number of embodiments of the invention.

The invention offers a fully monitored redundancy system that makes it distinctly suitable for medical and normal use. The automatic redundancy system ensures that if the autonomous rechargeable heated child's mat system experiences a partial heating system failure, it will attempt to increase its remaining functioning system's outputs in order ensure that child continues to remain warm in all conditions. The system will continue to monitor the current problem and monitor for further anomalies and make adjustments as necessary in real time without the intervention of the parent/operator. The parent/operator will be advised of any problems using the bi-directional wireless communication system that is embedded within the invention (Power Pack Controller Module). The parent/operator will be notified either on his or her mobile telephone or on laptop/pc/tablet/iPad®, whichever device is currently being used to control the system.

The invention offers the ability to control heating output in an almost continuously variable manner from less than 1% heating level all the way through to 100% heating. The parent/operator can also control heating levels in a regional manner, thus if he or she wishes more heat output on the leg's region of the heated mat, then output can be increased in this region specifically whilst maintaining lower heating levels to child's head and main body region. The system also ensures, if required, that a virtually balanced output throughout all the regions can be produced. The embedded electronic controller monitors and drives the different heating regions individually to ensure a complete uniformity of heat throughout the autonomous rechargeable heated mat. The invention monitors heating levels and outputs throughout the autonomous rechargeable heated mat with a plurality of embedded digital temperature sensors that are interfaced to the Microcontroller.

DETAILED DESCRIPTION OF THE INVENTION

Figure 1:
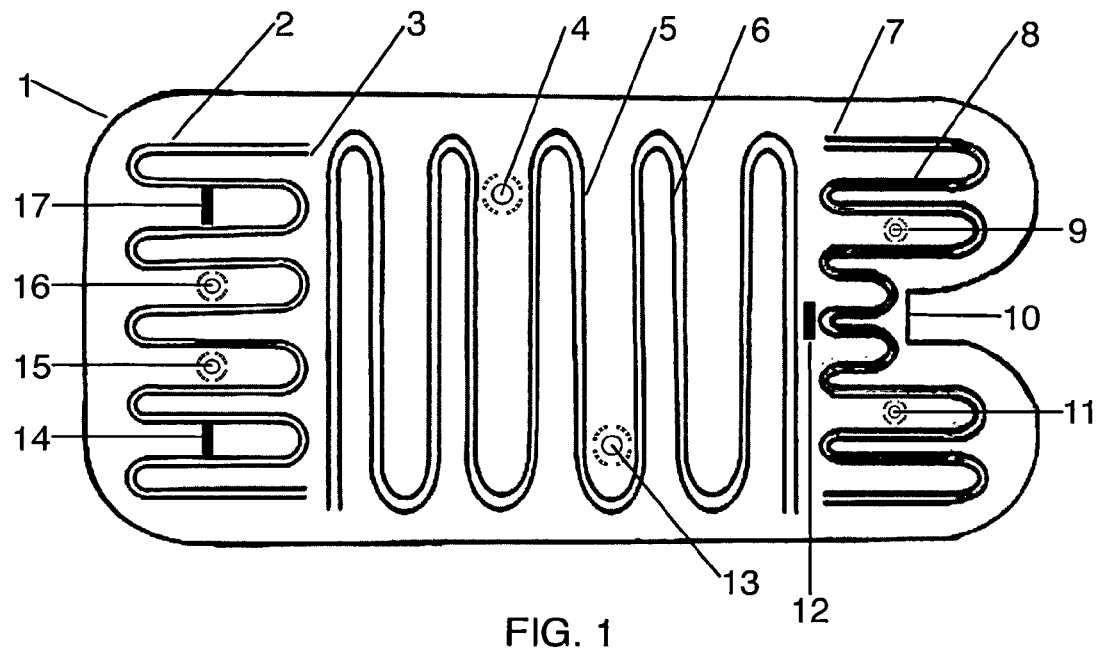
FIG. 1 shows the main components of the autonomous rechargeable heated child's mat. The primary and secondary heating channels along with temperature sensors and seatbelt cut-outs can be clearly seen.

An example of the invention will now be described by referring to the accompanying drawings:

FIG. 1 shows the basic structure of the autonomous, rechargeable heated child's mat 1. The components shown in the figure will be fully detailed in the description that follows. The figure shows the integrated digital temperature sensors 15, 16, 13, 4, 11 and 9. The base material of the autonomous, rechargeable heated child's mat 1 can be produced from a felt type fabric or similar material with the same basic properties. The Primary and Secondary heating channels within the three regions can be seen. The head region is heated by Primary heating channel 2 and the Secondary heating channel 3. The main body region is heated by the Primary heating channel 5 and the Secondary heating channel 6. The leg region is heated by the Primary heating channel 7 and Secondary heating channel 8. The rectangular opening slots 14, 17 and 12 for the seat belt fastenings can clearly be identified on the base material. The slots edges are machine over locked to avoid fraying. The cut-out shape 10 is to allow the base material to fit around the lower seatbelt fastening, if one is present in the particular embodiment that it is fitted within.

Figure 2:
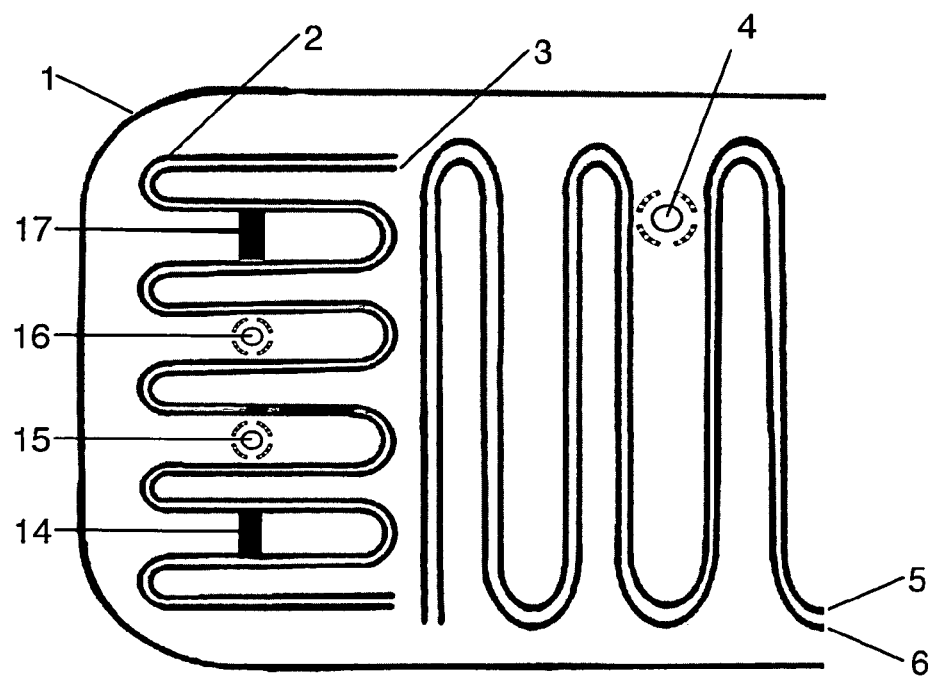
FIG. 2 shows an enlarged view of the head region of the autonomous rechargeable heated child's mat. The primary and secondary heating channels along with temperature sensors and seatbelt cut-outs can be clearly seen.

FIG. 2 shows an enlarged view of the head and top section of the main body region of the heated mat structure. The two digital temperature sensors located in the head region 15 and 16 can clearly be seen. The rectangular cut-outs for the upper seatbelt fastenings 14 and 17 can also be seen located to the sides of the digital temperature sensors 15 and 16. The Primary 2 and Secondary 3 head region heating channels are also clearly identifiable in this enlarged figure. The top half of the Primary 5 and Secondary 6 main body heating channels can also be clearly seen. One of the digital temperature sensors 4 for the main body section can also be seen.

Figure 3:
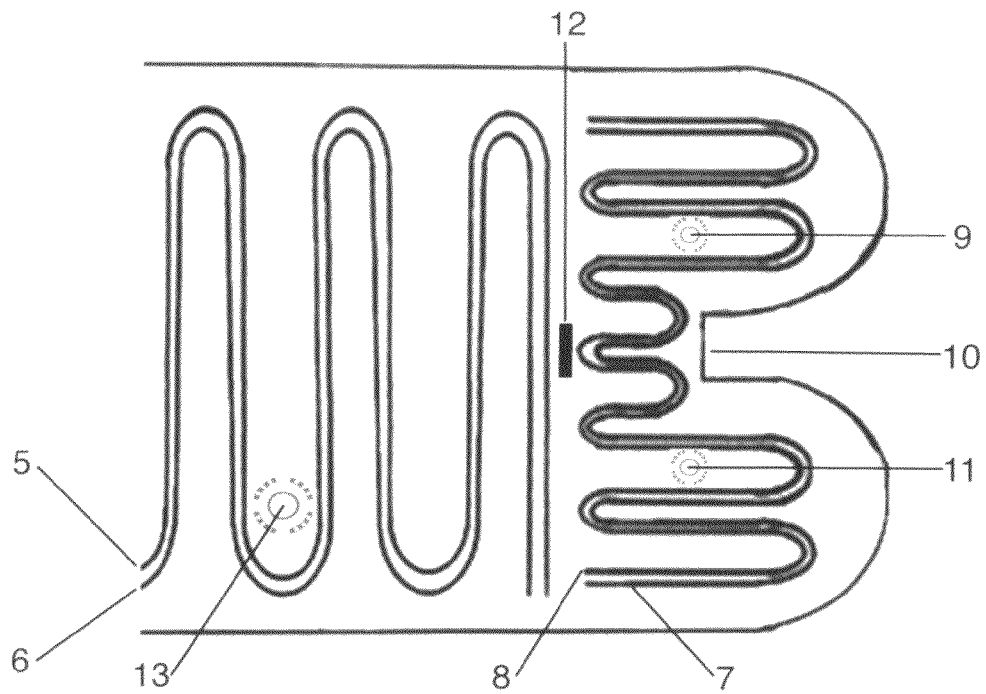
FIG. 3 shows the an enlarged view of the leg region of the autonomous rechargeable heated child's mat. The primary and secondary heating channels along with temperature sensors and seatbelt cut-out can be clearly seen.

FIG. 3 shows the enlarged view of the leg heating region and lower middle section of the main body section. The lower portion of the Primary 5 and Secondary 6 heating channels of the main body section can also be clearly identified. The lower main body section digital temperature sensor 13 can also be seen. The Primary 7 and Secondary 8 heating channels of the leg section can also be clearly identified. The lower rectangular cut out for the seat belt fastening 12 can also be seen. The digital temperature sensors 9 and 11 located in the leg region can be seen. The lower seatbelt fastening cut out shape 10 can also be seen.

Figure 4:
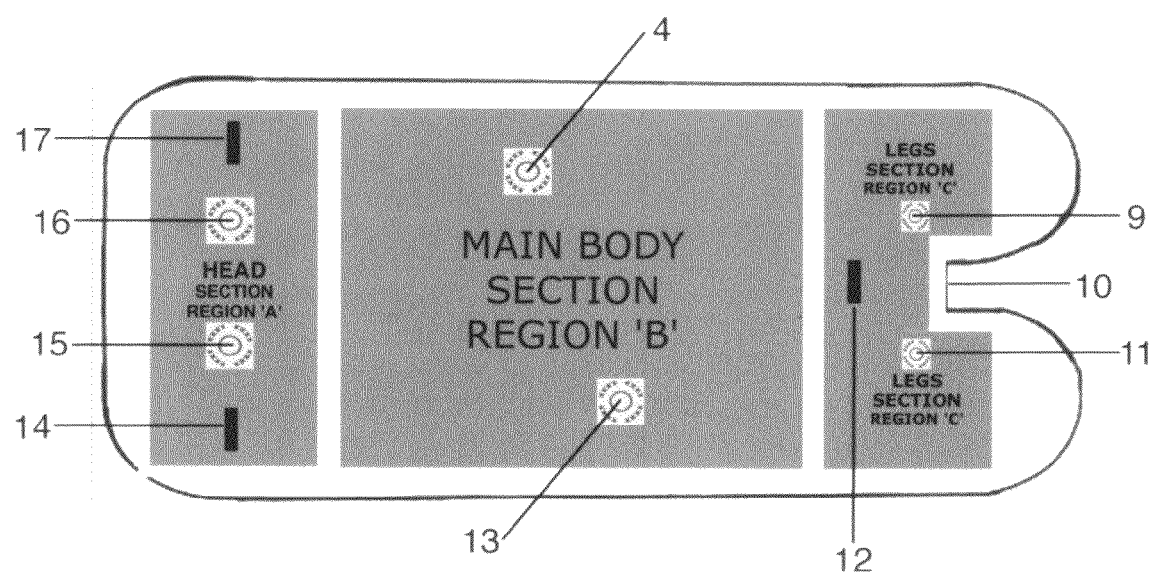
FIG. 4 shows an enlarged view of the three main heating regions of the autonomous recharge heated child's mat along with the temperature sensor positions and seatbelt cutouts.

FIG. 4 clearly depicts visually the three main heating regions. The figure clearly shows the head, main body and legs region which can each be individually controlled by the parent/operator. The figure also shows the seat belt cutouts 14, 17 and 12. The six digital temperature sensors 15, 16, 13, 4, 11 and 9 are also clearly visible within each of the separate regions. The head region is controlled by temperature sensors 15 and 16. The main body section being controlled by sensors 13 and 4. The leg region being controlled by sensors 11 and 9. The cut-out shape 10 is to allow the base material to fit around the lower seatbelt fastening, if one is present in the particular embodiment that it is fitted within.

Figure 5:
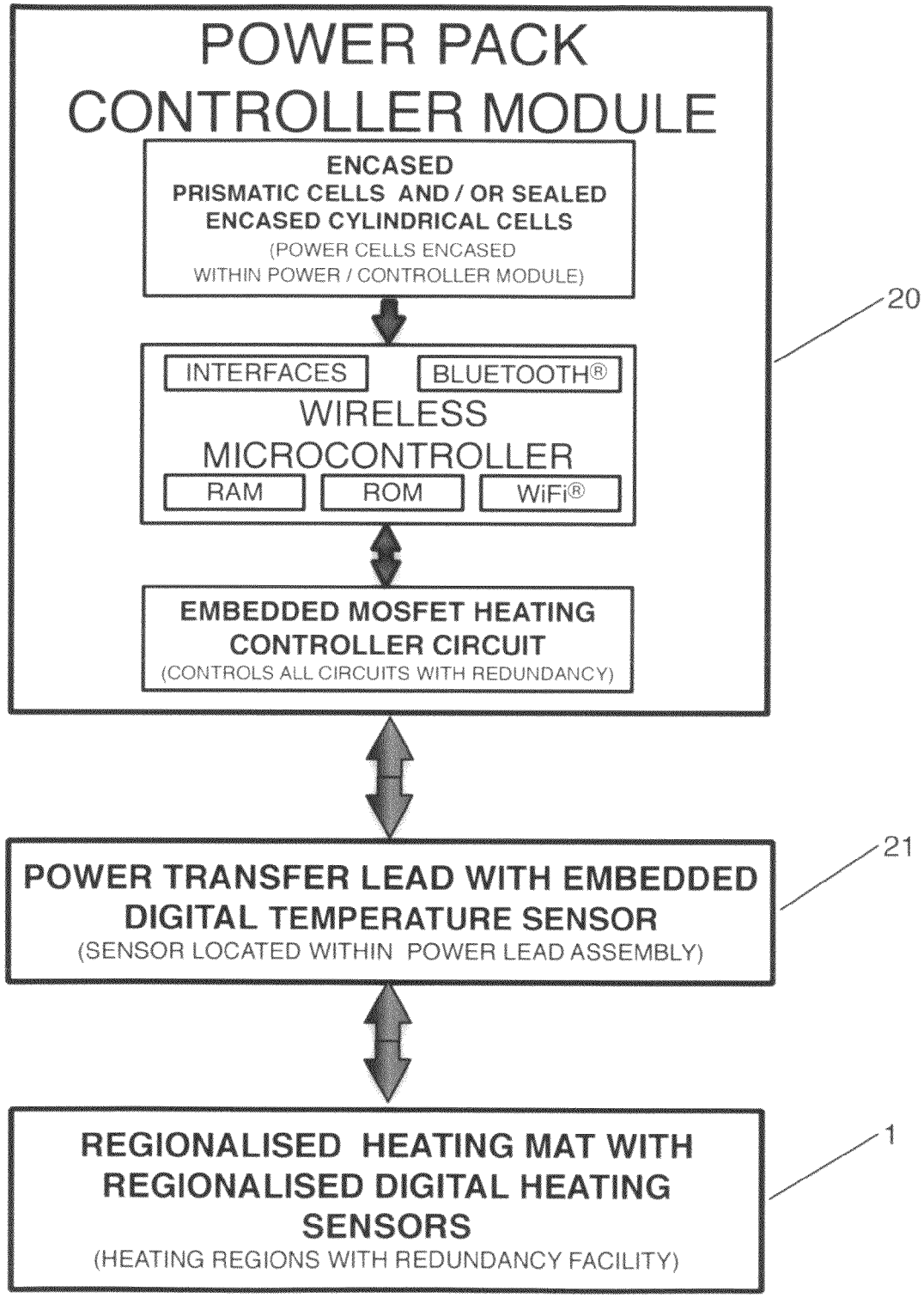
FIG. 5 shows a system diagram depicting the three main components of the autonomous rechargeable heated child's mat along with communication and power links between the components.

FIG. 5 shows the main three components of the system. The Power Pack Controller Module 20 contains the power source (Prismatic or Cylindrical Cells pack), the Microcontroller with Wireless interface board and MOSFET Heating Circuit Controller which drives the heating channels. The Power Pack Controller Module 20, is connected to the Regionalised Heating Mat with Regionalised Digital Temperature Sensors 1, via a Power Transfer Lead with Embedded Digital Temperature Sensor 21. The figure identifies the communication and power links between the three separate components of the system.

Figure 6:
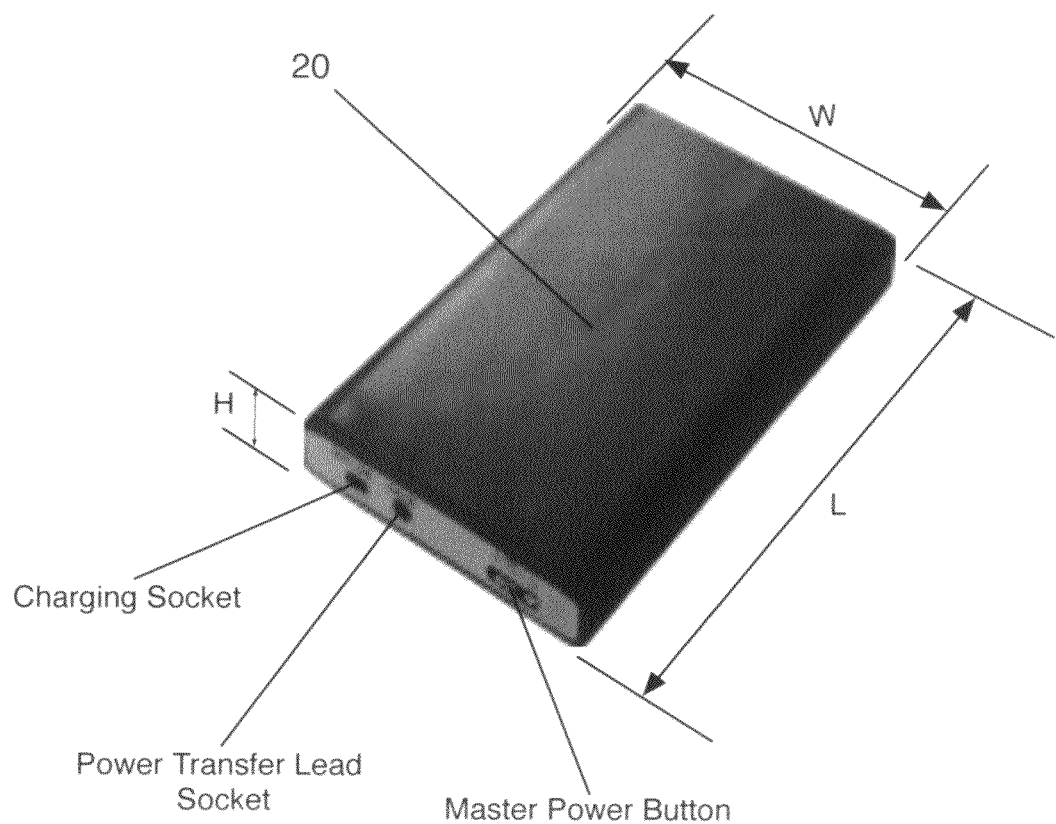
FIG. 6 shows the Power Pack Controller Module with its master power button, power transfer lead socket and charging socket.

FIG. 6 shows the Power Pack Controller Module 20. This sealed unit is rated to IP68. The size of the unit in one particular embodiment is approximately eleven (11) inches (28 cm) long (L) by nine (9) inches (23 cm) wide (W) by three (3) inches (8 cm) in height (H). Alternative sizes of the unit will be dependant upon the power capacity of the Prismatic or Cylindrical cell packs encased within the unit. The front of the Power Pack Controller Module 20 has a 'Master Power Button' this is used as a main switch to completely isolate the unit and turn off all outputs. A 'Power Transfer Lead Socket' is also positioned on the front of the unit, this is used to connect the 'Power Transfer Lead with Embedded Digital Temperature Sensor' 21. An alternative embodiment of this Power Pack Controller Module 21 may have a plurality of power transfer lead sockets so as to power two or more Regionalised Heating Mats 1 from one Power Pack Controller Module 21, such as in the case of a twin buggy or two car seats positioned adjacent to each other. The last connector socket on the front of the unit is a 'Charging Socket' for connecting it to either a mains voltage charger (110/120V-220/240V) or a vehicle charger (12V-24V) for charging whilst mobile.

Figure 7:
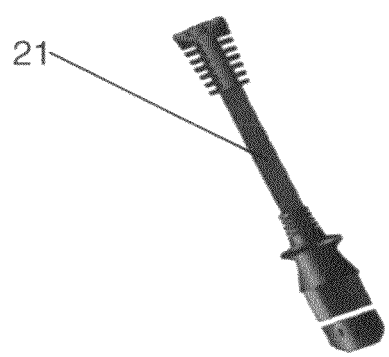
FIG. 7 shows the Power Transfer Lead with Embedded Digital Temperature Sensor.

FIG. 7 shows the Power Transfer Lead with Embedded Digital Temperature Sensor 21. This lead connects at one end to the Power Pack Controller Module 20 and at the other end to the Regionalised Heating Mat with Regionalised Digital Temperature Sensors 1. The Power Transfer Lead has a digital temperature sensor embedded within the lower section for sensing ambient temperature. The temperature data from the embedded sensor is fed directly into the Microcontroller and is used to assist in calculating and controlling the heating output of the child's Regionalised Heating Mat 1.

Figure 8:
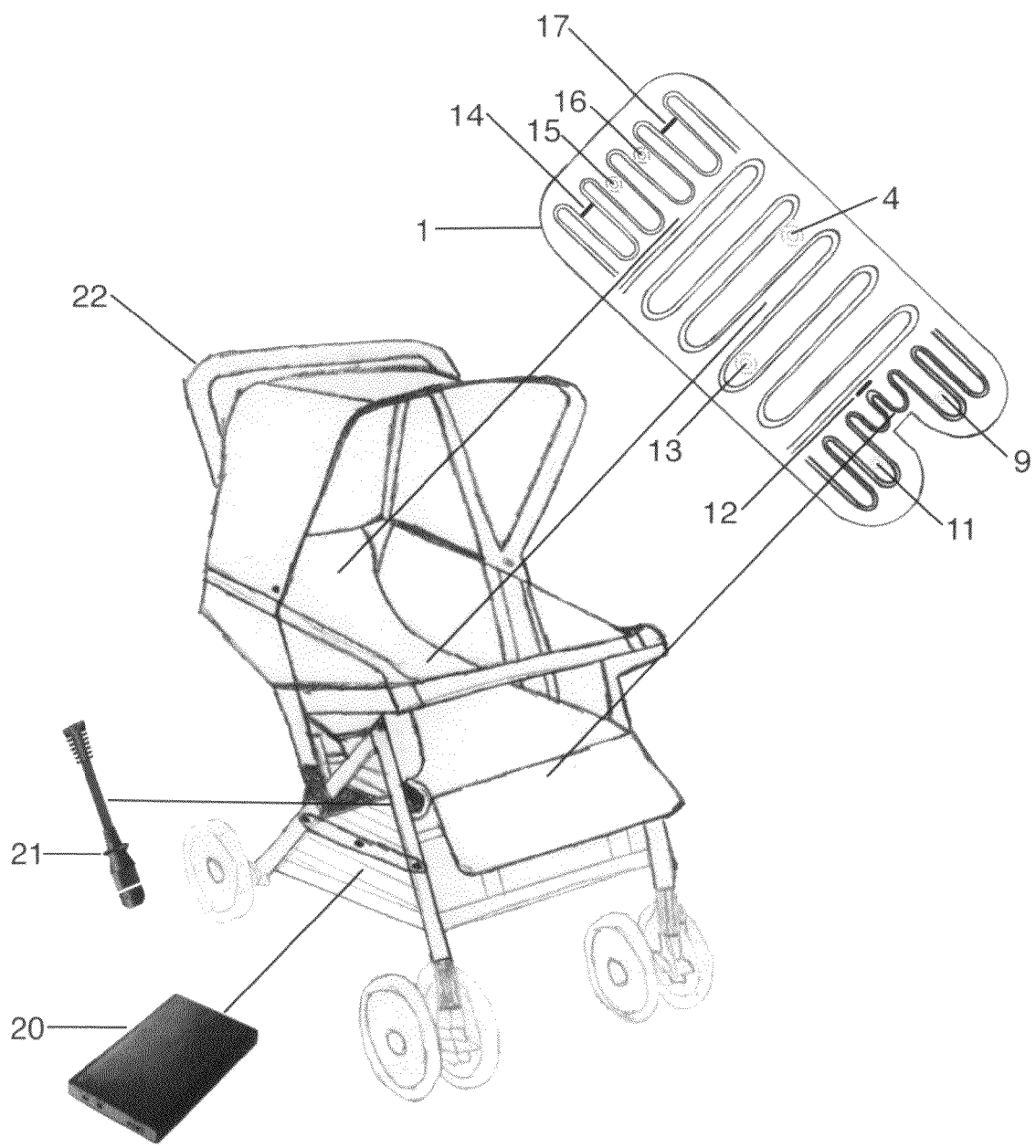
FIG. 8 shows embodiment of the Autonomous Rechargeable Heated Child's Mat with a child's pushchair. The Power Pack Controller Module and Power Transfer Lead with Embedded Digital Temperature Sensor are also depicted.

FIG. 8 depicts one possible embodiment of the Regionalised Heating Mat with Regionalised Digital Temperature Sensors 1 within a child's pushchair 22 (stroller/buggy/carriage). The Regionalised Heating Mat with Regionalised Digital Temperature Sensors 1, is positioned on the seat. The mat would be covered with a suitable shaped fabric covering. The Power Pack Controller Module 20 is located under the seat on the lower shelf area. The Power Pack Controller Module 20 is connected to the Regionalised Heating Mat with Regionalised Digital Temperature Sensors 1, via the Power Transfer Lead with Embedded Digital Temperature Sensor 21, this would be held in position with Velcro® straps or similar fastening device positioned around the frame of the pushchair.

Figure 9:
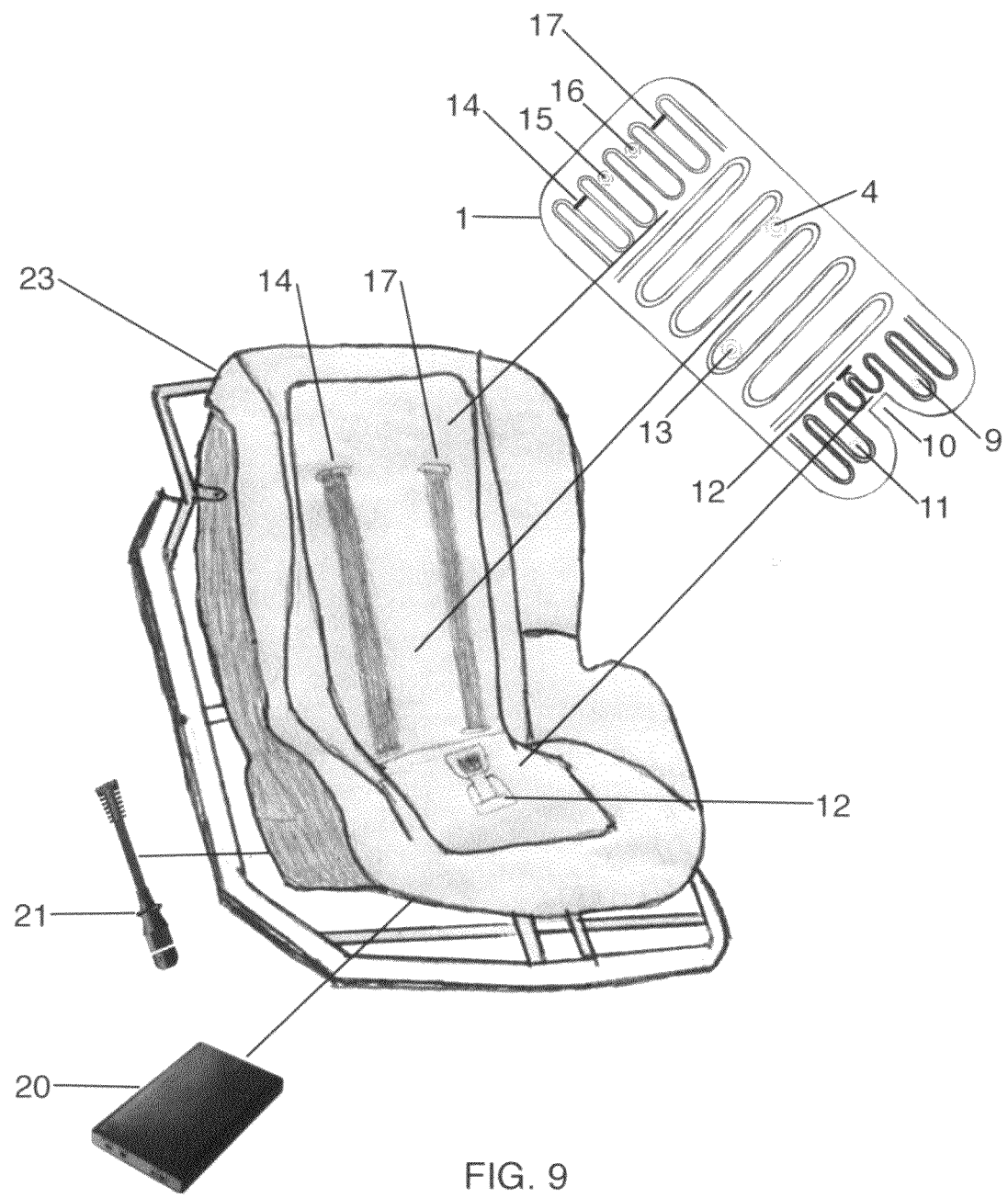
FIG. 9 shows and alternative embodiment of the Autonomous Rechargeable Heated Child's Mat with a child's carseat. The Power Pack Controller Module and Power Transfer Lead with Embedded Digital Temperature Sensor are also depicted.

FIG. 9 depicts an alternative embodiment of the Regionalised Heating Mat with Regionalised Digital Temperature Sensors 1 within a child's car seat 23. The Regionalised Heating Mat 1, is positioned on the seat. The mat would be covered with a suitable shaped fabric covering. The Power Pack Controller Module 20 is located under the frame of the seat and held in position with Velcro® straps or similar fastening device. The Power Pack Controller Module 20 is connected to the Regionalised Heating Mat 1, via the Power Transfer Lead with Embedded Digital Temperature Sensor 21, this would be held in position with Velcro® straps or similar fastening device positioned around the car seat's frame.

Figure 10:
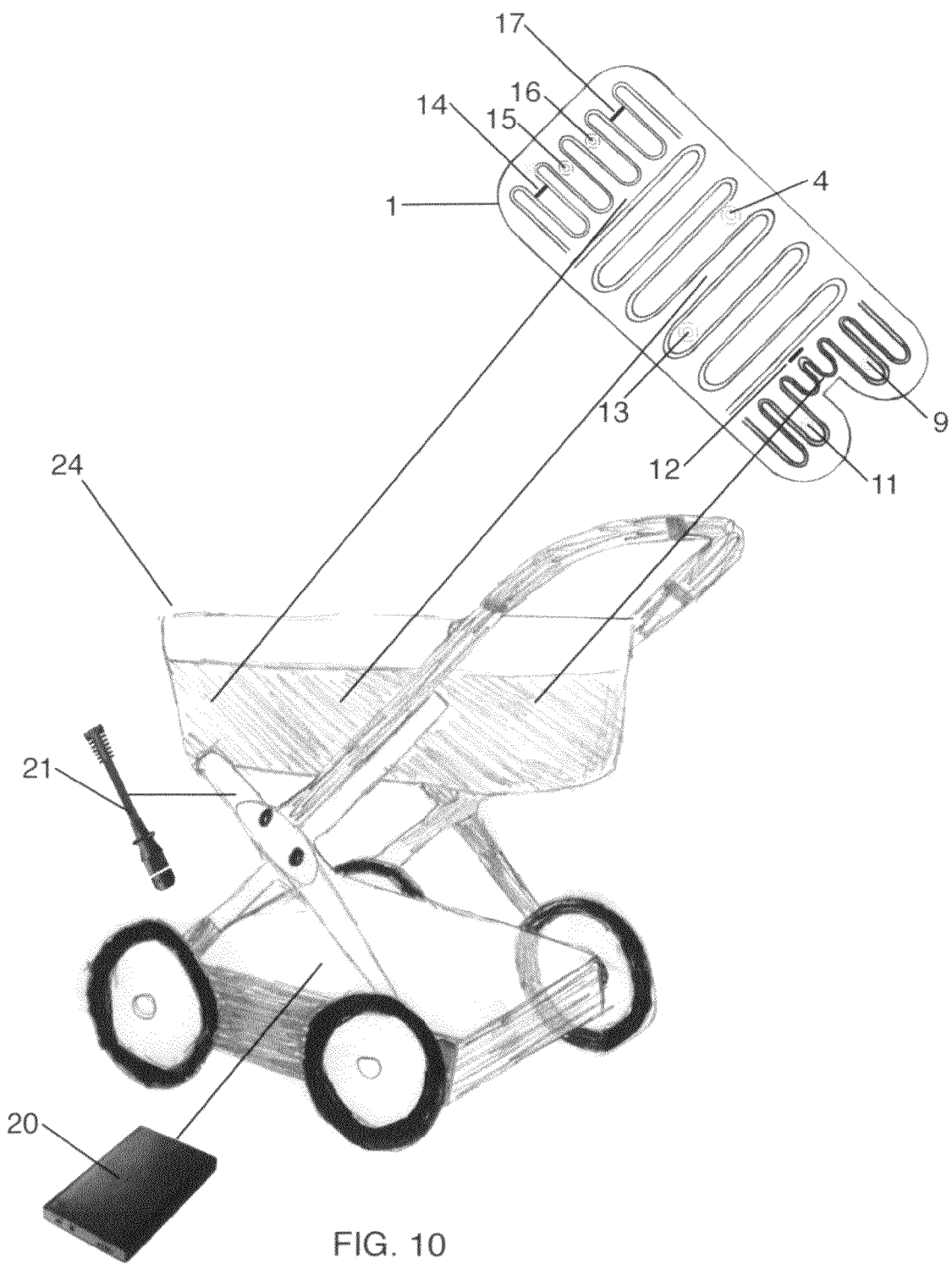
FIG. 10 shows and alternative embodiment of the Autonomous Rechargeable Heated Child's Mat with a pram. The Power Pack Controller Module and Power Transfer Lead with Embedded Digital Temperature Sensor are also depicted.

FIG. 10 depicts a further alternative embodiment of the Regionalised Heating Mat with Regionalised Digital Temperature Sensors 1 within a pram 24. The Regionalised Heating Mat 1, is positioned on the pram. The Heating Mat would be covered with a suitable shaped fabric covering. The Power Pack Controller Module 20 is located under the frame of the pram and held in position with Velcro straps on a shelf. The Power Pack/Controller Module 20 is connected to the Regionalised Heating Mat 1, via the Power Transfer Lead with Embedded Digital Temperature Sensor 21, this would be held in position with Velcro® straps or similar fastening device positioned around the pram's frame.

Figure 11:
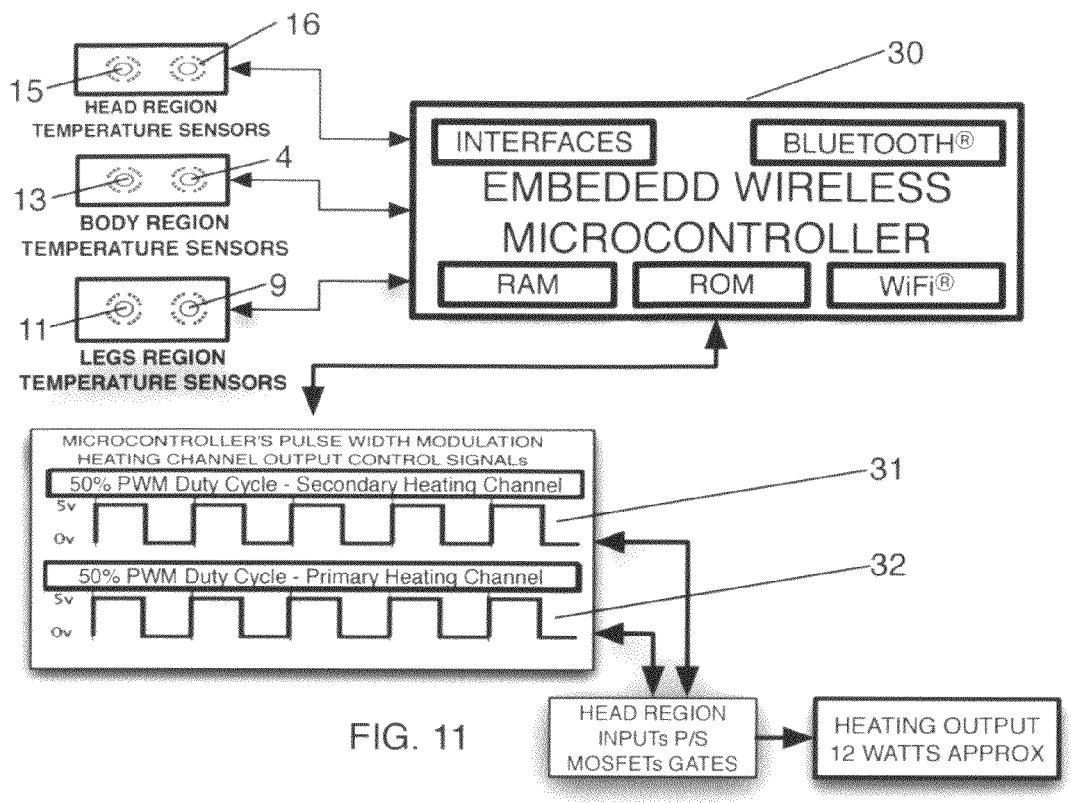
FIG. 11 shows the components of the system that drive the primary and secondary heating channels in the head region of the Autonomous Rechargeable Heated Child's Mat. The primary and secondary channels are both being driven with a 50% duty-cycle PWM signal.

FIG. 11 depicts the components of the system that drive the Primary and Secondary heating channels in Head Region of the autonomous Regionalised Heating Mat. The components detailed in FIG. 11 are Regional Temperature Sensors for the three regions, Head, Main Body and Legs as follows (Head Region—15/16), (Main Body Region—13/4) and (Legs Region—11/9) respectively. The temperature sensors information is relayed into the Microcontroller via a "1-Wire" digital interface. The Microcontroller outputs in this embodiment two PWM (Pulse Width Modulation) control signals. The PWM signals feed the individual gates of the Embedded MOSFETs, depicted in the figure as "MOSFET HEATING CIRCUIT CONTROLLER" (EMHCC). The EMHCC drives the Primary and Secondary heating channels of each of the three regions individually. FIG. 11 shows three separate regions being monitored by two digital temperature sensors in each region (total 6 heating sensors in this particular embodiment depicted). The Embedded Microcontroller then outputs two individually generated PWM signals 31 and 32 for each of the regions. The figure shows that the Primary Heating Channel in Head Region is being driven with an 50% (fifty) duty-cycle 32 and that the Secondary Heating Channel in the same region (Head) is being driven with a 50% (fifty) duty-cycle 31; these two signals are then fed directly into the EMHCC. The Primary Heating Channel 2 and Secondary Heating Channel 3 are driven by the Primary and Secondary Channel Outputs 32 and 31 respectively of the EMHCC. The EMHCC in this embodiment has a further two inputs and outputs pairs (heating channel pairs) for the legs region and the main body region which in this figure are not depicted as being connected. The output of the head region with a 50% duty-cycle on both the Primary 32 and Secondary 31 channel outputs would be approximately 12 (twelve) Watts total heating output.

Figure 12:
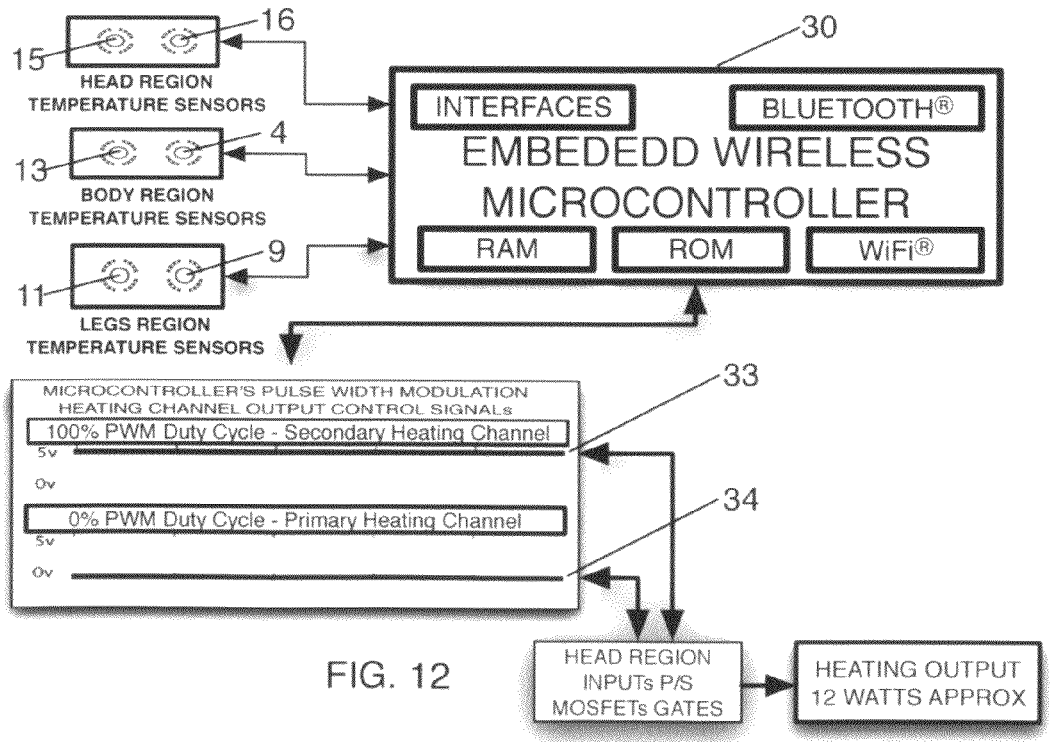
FIG. 12 shows the components of the system that drive the primary and secondary heating channels in the head region of the Autonomous Rechargeable Heated Child's Mat. The primary and secondary channels are now being driven with a 0% duty-cycle and 100% duty-cycle PWM signal respectively.

FIG. 12 depicts the same components as FIG. 11 detailed above. However, in this representation it can be seen that the PWM signals of the Primary 34 and Secondary 33 heating channels are different. The Primary PWM signal is outputting a 0% duty-cycle (zero output) and the Secondary PWM signal is outputting a 100% duty-cycle signal (on full-time). The approximate combined (Primary and Secondary heating channels) heating output is 12 (twelve) Watts of heating output for the head region. The output at 12 Watts is virtually identical to that of FIG. 11 with a PWM signal of 50% duty-cycle each on the Primary 32 and Secondary 31 heating channels respectively for the head region. This virtually identical heating output demonstrate the possible scenario of a complete failure of Primary Heating Channel and thus the Secondary Heating Channel being driven at an increased duty-cycle in an attempt to re-establish the desired heating output as it was prior to the failure of the Primary Heating Channel. A detailed discussion of this redundancy control system will be given further in the main description that follows.

Figure 13:
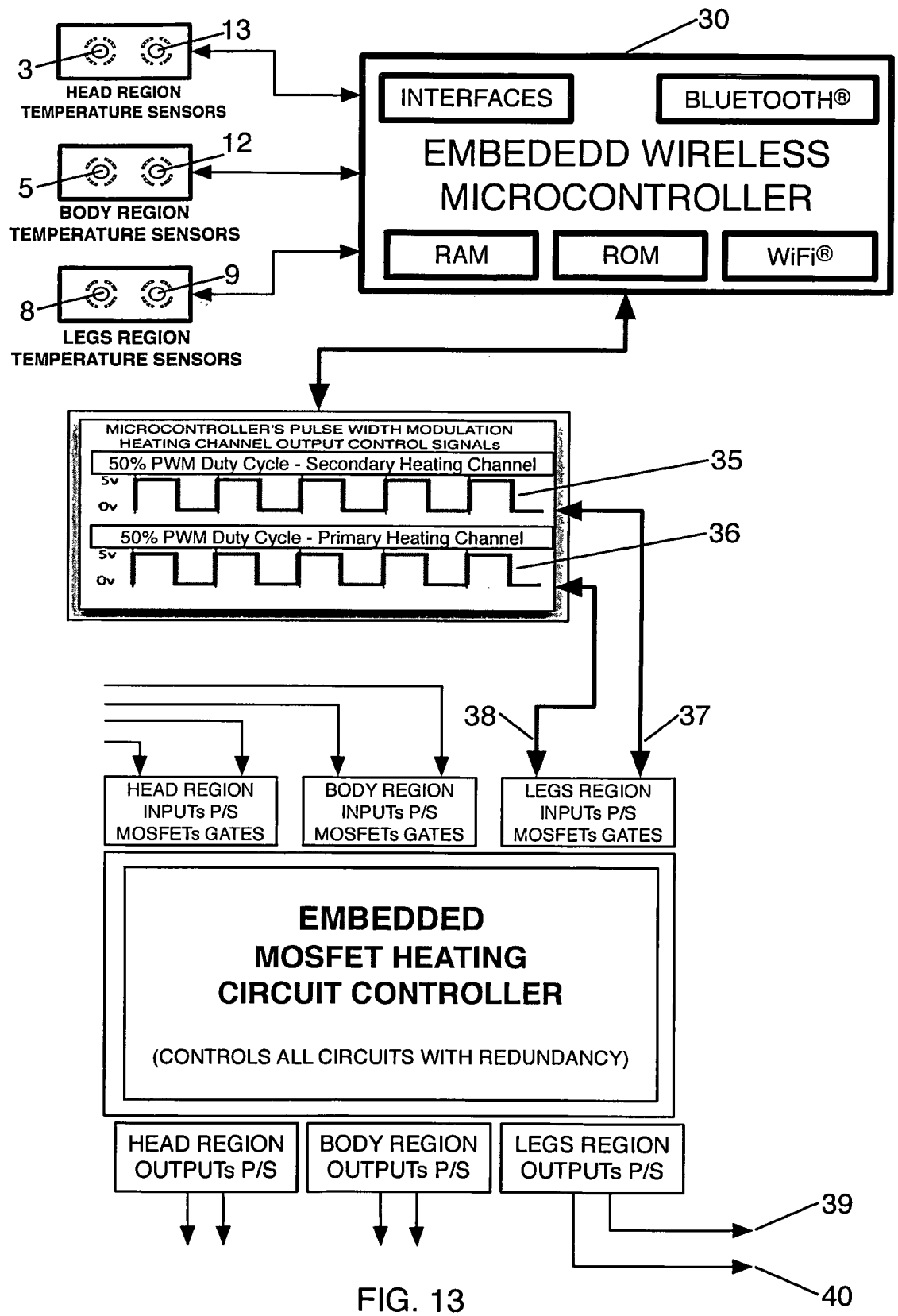
FIG. 13 shows the complete system components that drive the heating channels of the three separate heated regions of the Autonomous Rechargeable Heated Child's mat. The embedded wireless microcontroller and embedded mosfet heating circuit controller are depicted.

FIG. 13 shows a complete system chart from the digital regional temperature sensors for the three separate regions; each separate region having two digital temperature sensors within it. The temperature sensor information is fed into the embedded wireless microcontroller. The operating code (firmware) in the microcontroller generates the PWM (Pulse Width Modulation) output subject to the operating settings input by the parent/operator, via the wireless link to the mobile telephone 41 or laptop/pc/tablet/iPad® 43 and the temperature information received from the regional digital sensors, including ambient temperature from the Power Transfer Lead with Embedded Digital Temperature Sensor 21. The PWM signals are then fed into the Embedded MOSFET Heating Circuit Controller, which directly drives the Primary and Secondary Heating channels of each of the three separate regions. The figure depicts the legs region being driven. The digital temperature sensors 8 and 9 information is fed into the embedded microcontroller, this produces two PWM driving signals 36 and 35, Primary and Secondary respectively. The PWM signals are then fed into the Embedded MOSFET Heating Circuit Controller (EMHCC) for the legs region 38 and 37. The Embedded MOSFET Heating Circuit Controller then drives the Primary 40 and Secondary 39 heating channels for the legs region. FIG. 13 for clarity only depicts the legs region being driven, however the main body and the head region are driven in exactly the same manner, with the respective sensors and PWM signals for each of the remaining two regions.

Figure 14:
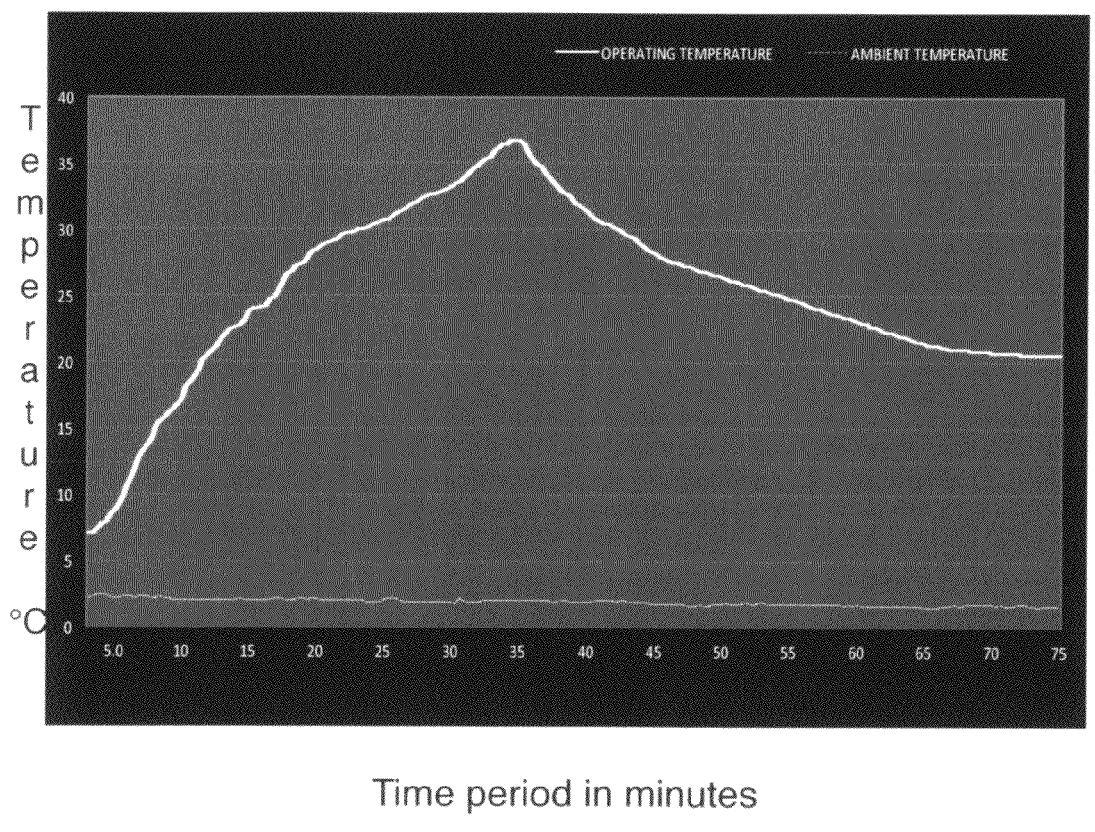
FIG. 14 shows a graph depicting the temperature rise of the main body region of the Autonomous Rechargeable Heated Child's Mat fitted to a child's pushchair over a seventy-five minute running period.

FIG. 14 shows a graph accurately plotted with the temperature rise of the main body region of the Autonomous Rechargeable Heated Child's Mat fitted to a child's pushchair. The graph indicates the temperature rise and fall over a period of time in minutes from zero (0) to seventy-five (75). The two traces on the graph depict both the operating temperature and the ambient temperature in degrees C. The ambient temperature remained at around 2.5 degrees C. during the operational period of seventy-five minutes. The system was set at full power for the initial thirty-five (35) minutes. The heating level was then adjusted to approximately 20 degrees for the remaining period shown on the graph.

Figure 15:
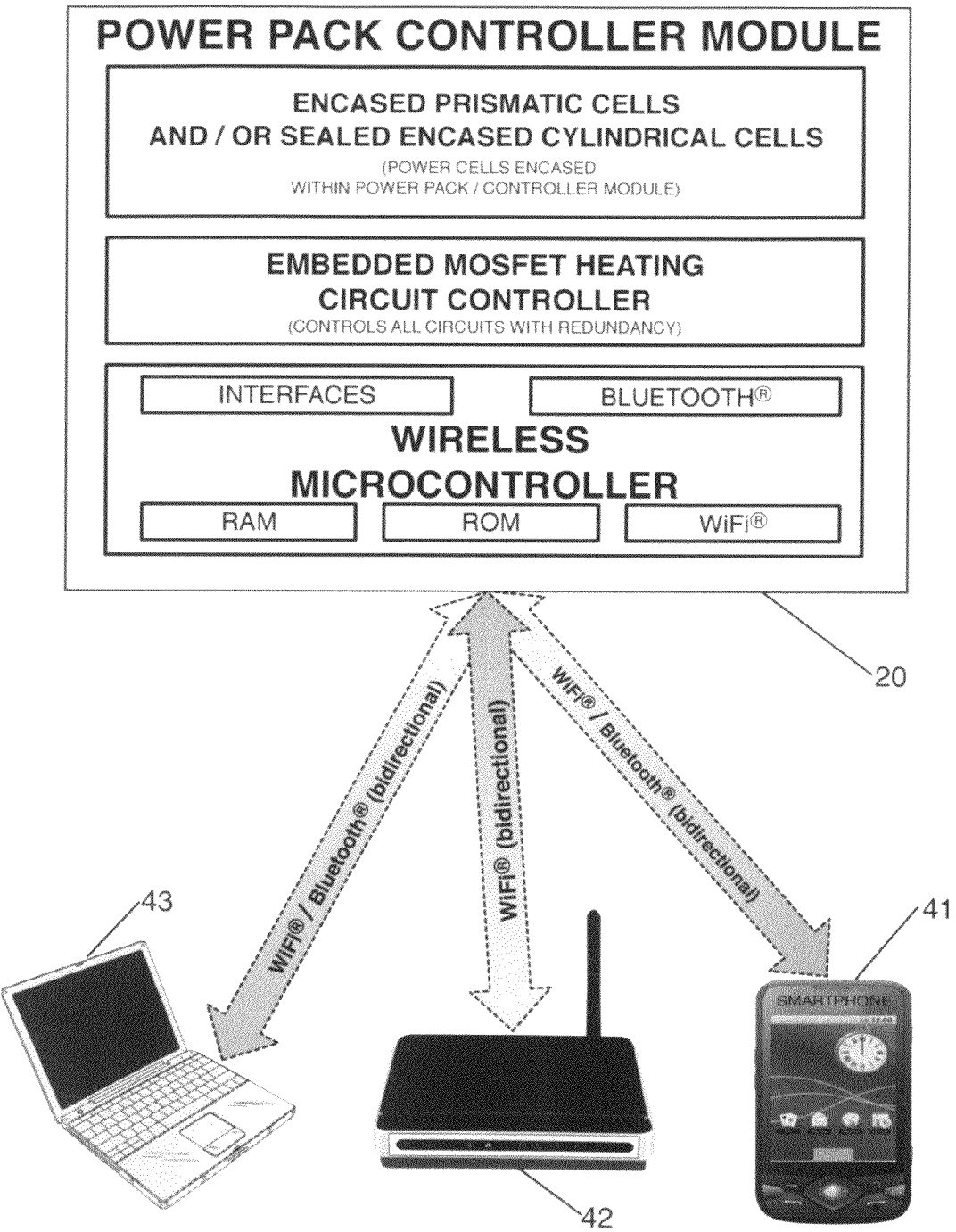
FIG. 15 shows a graphical representation of the bidirectional communication that occurs between the Power Pack Controller Module of the Autonomous Rechargeable Heated Child's Mat and the controlling device such as a mobile, router or laptop.

FIG. 15 is a graphical representation of the bidirectional communication via WiFi®/Bluetooth® that occurs between the Power Pack Controller Module 20 of the Autonomous Rechargeable Heated Child's Mat and the controlling device. The microcontroller with wireless module communicates in a bidirectional manner with a mobile telephone 41, wireless router 42 or a laptop 43 (computer/tablet/iPad®) to monitor and control the heat distribution and output level (wattage) of the Autonomous Rechargeable Heated Child's Mat. The bidirectional wireless communication between the Mat and the various wireless controlling devices, mobile 41, router 42 and laptop 43 (computer/tablet/iPad®) allows the system to report any errors or anomalies to the parent/operator. The system can also communicate additional information such as battery level status and varying ambient temperature, particularly important if the ambient temperature is falling to around 0 degrees C. (freezing).

Figure 16:
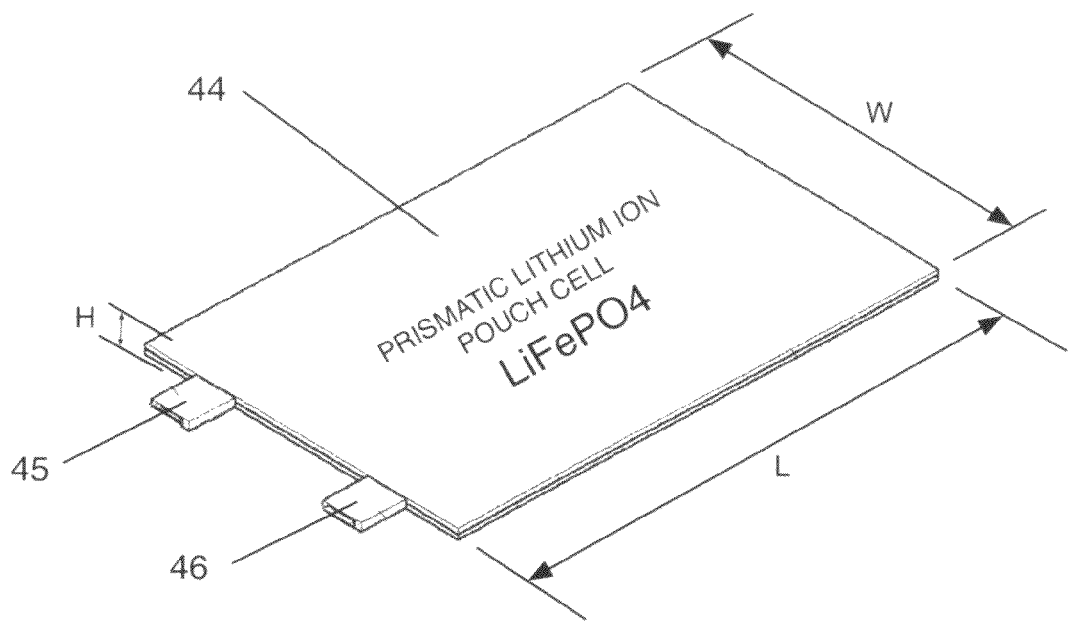
FIG. 16 shows a graph of the Discharge Curve of the Prismatic Lithium Ion Power Cell over a four hour running period of the Autonomous Rechargeable Heated Child's Mat.

FIG. 16 is the "Discharge Curve" for the Prismatic Lithium Ion Power Cell (pack) as embedded in the Power Pack Controller Module 20. The graph was produced by testing the aforementioned cell at an operating temperature of 0 degrees C., with a Constant Current (CC) load of 4.2 Amps (4200 ma) applied. The results were logged on a "Fluke® 289" True-rms Industrial Logging Multimeter (DMM) with "TrendCapture" facility. The voltage output of the cell was data logged at 1-minute intervals into the internal memory of the Fluke® 289 before exporting the logged data to specialist "FlukeView® Forms" software via an I.R. to usb interface cable suitably attached to the Fluke® 289 DMM. The graph shown in FIG. 16 clearly demonstrates the extremely flat power discharge characteristics of the Prismatic Lithium Ion Power Cell (LiFeP04) embedded within the Power Pack Controller Module 20. A similar discharge curve would be expected to be produced by the alternative sealed abs (or similar material) encased cylindrical power cells of a similar chemistry type.

Figure 17:
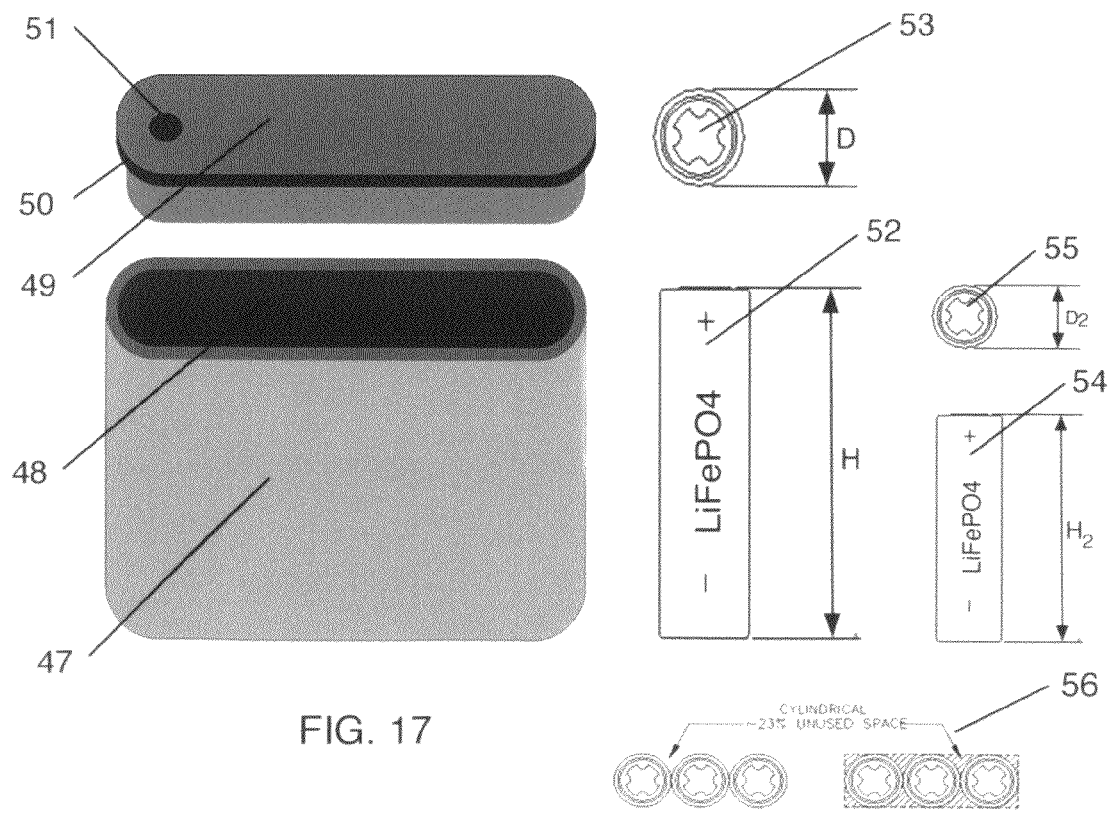
FIG. 17 shows a graph of the Discharge Curve of the Alkaline Power Pack over a six hour running period of the Autonomous Rechargeable Heated Child's Mat.

FIG. 17 is the "Discharge Curve" for an alternative power cell produced fundamentally from Alkaline based chemistry. The same testing equipment (Fluke® 289 DMM & FlukeView® Forms software) and procedure was used to produce this discharge curve graph. This test was conducted at an operating temperature of 10 degrees C., with a Constant Current (CC) load of 4.2 Amps (4200 ma) applied once again. The voltage output of the cell was data logged at 1-minute intervals into the internal memory of the Fluke® 289 before exporting the logged data to specialist "FlukeView® Forms" software as previously. The significantly steeper characteristics of this curve with an appreciably higher (warmer) operating temperature will be discussed later in direct comparison to the Prismatic Lithium Ion Power Cell embedded in the Power Pack Controller Module 20, or the alternative sealed encased cylindrical cells of the same chemistry type.

Figure 18:
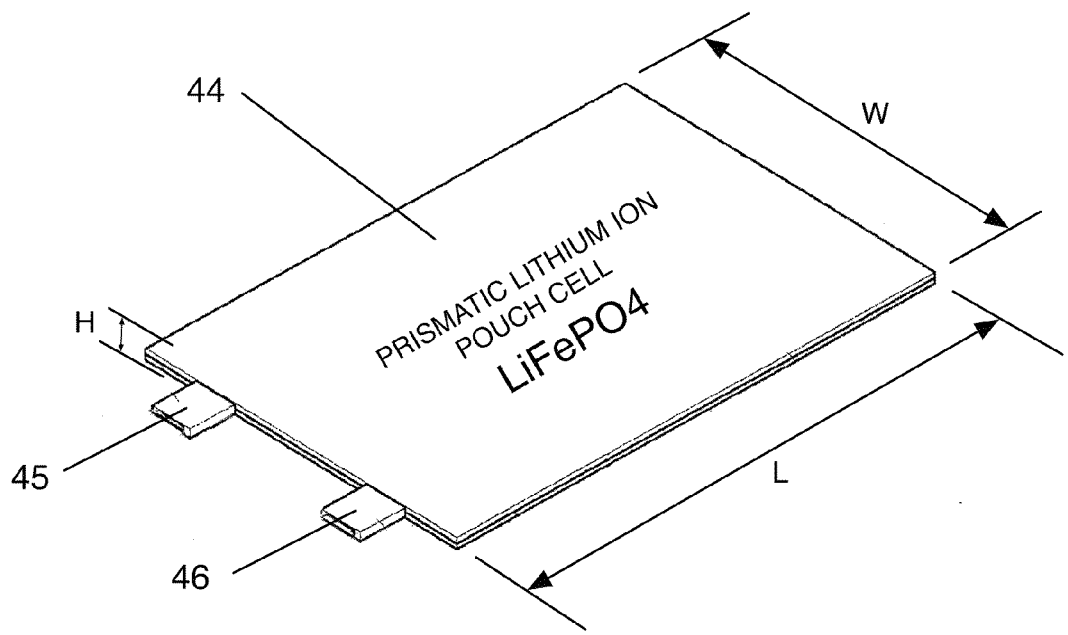
FIG. 18 shows a Prismatic Lithium Ion Pouch Cell (LiFePO4) with its anode and cathode tabs clearly visible.

FIG. 18 is a drawing showing the Prismatic Lithium Ion Pouch Cell 44, which in one embodiment of the Autonomous Rechargeable Heated Child's Mat is located within the Power Pack Controller Module 20. The output terminal tabs (Anode and Cathode) 45 and 46 are clearly identifiable on one of the shorter sides of the pouch. The width (W) of the pouch, length (L) and height (H) will vary in direct proportion to the cell's output capacity (Ah). One particular useable embodiment would be 120 mm (L) by 60 mm (W) by 10 mm (H) (4.7 inches by 2.4 inches by 0.4 inches respectively), having a rated output capacity of 6.3 Ah (6300 mAh). A plurality of varying cell (Prismatic Lithium Ion Pouch) sizes could be implement subject to a number of specific requirements and constraints including rated cell power (Ah), running time required, heating output required relative to normal ambient temperature (total combined channel wattage) and space availability amongst a number of other variable factors which may need to be considered.

Figure 19:
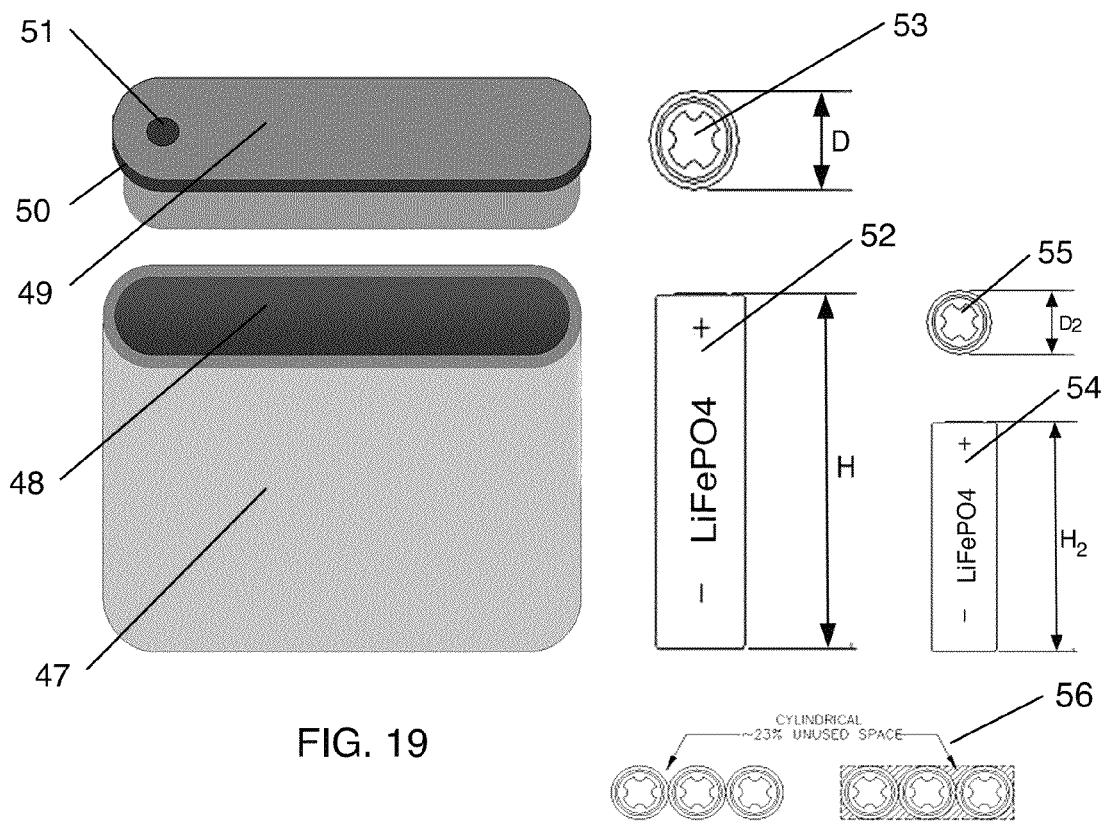
FIG. 19 shows a battery case made from ABS or similar material with cylindrical battery cells of varying sizes made from a Lithium Ion chemistry (LiFePO4).

FIG. 19 shows an alternative possible method of embedding Lithium Ion Cells (or similar chemistry cells) within the Autonomous Rechargeable Heated Child's Mat. The figure shows one possible design for an ABS (or similar type material) battery cell casing 47 with separate top 49 produced in ABS (or similar type material) and sealed onto the main cell casing 47 with suitable sealant being used around the lower lip 50 of the casing top 49. An alternative material could be used to produce the battery cell case, with similar properties to ABS. The casing top has a suitably sized (diameter) exit hole 51 for the power leads to exit the sealed battery casing. The battery cell casing 47 has rounded edges to minimise wasted space associated with the use of cylindrical cells. A representation of wasted space associated with cylindrical cells is depicted graphically 56. A number of different cylindrical cells with varying diameters 53 and lengths 52 could be implemented subject once again, to a number of different factors, similar to those already discussed in the description of FIG. 18 above. One possible Lithium Ion cell chemistry embodiment (LiFeP04) 52, can be seen with a height (H) and a diameter (D). The diameter of the cell would be nominally smaller than the width of the ABS casing's (or similar material) internal wall dimension 48 so that the cells fit tightly into the casing and allow for some expansion during charging and any exothermic reaction, which may occur during high current drain situations such as full heat output of the Autonomous Rechargeable Heated Child's Mat. An alternative smaller length ($H_2$) and diameter ($D_2$) cylindrical cell 54 is shown. This smaller cell size would be suitable in an embodiment which required reduced running time or lower heating output (Wattage). The output voltage of the cell would be the same as the larger cell 52, but the Ah (amp/hour) capacity of the cell would be reduced in proportion to its reduction in size and volume ($H_2$ and $D_2$). The cells shown in FIGS. 18 and 19 are of Lithium Ion type chemistry, a plurality of other cell chemistry compositions exists such as Nanophosphate Lithium Ion, Ext Nanophosphate Lithium Ion, Nickel Cadmium, Nickel-metal Hydride, Lithium Ion, Lithium Ion Polymer and Lithium Iron Phosphate, amongst a variety of other known chemistry types. These alternative cell type compositions exist in a variety of formats such as prismatic pouches and cylindrical cell formats. The ABS casing (or similar material) 47 allows for any one of these types of chemistry to be used in any one specific embodiment of the Autonomous Rechargeable Heated Child's Mat.

The invention relates to a mobile Autonomous Rechargeable Heated Child's Mat, which can be incorporated into virtually any form of child's pushchair, pram, buggy, stroller, carriage or similar child's conveyance. The following paragraphs give a detailed description of a number of possible embodiments for this invention, its design, construction and its manner of operation. The extremely flexible nature of this invention allows for a considerable number of possible embodiments; the embodiments shown in the figures and discussed herein are only a small representation of the immense number of possible wide ranging embodiments, and thus should not be considered to be exhaustive in any manner.

The Autonomous Rechargeable Heated Child's Mat will for the remainder of this description be referred to as the ARHCM.

DETAILED DESCRIPTION

The ARHCM has its own dedicated embedded power source; in the particular embodiments depicted in the figures, the embedded power source may consists of a plurality of Lithium Ion Prismatic Pouch Cells 44 or alternatively a plurality of cylindrical power cells (52, 54) with a similar chemistry base. The cylindrical cells would be encased in a sealed slim-line case 47 made from ABS material or similar material; this cell type is depicted in FIG. 19. A plurality of Prismatic Pouch Cells 44 or cylindrical encased power cells (52, 54) can be incorporated dependant upon the required output (heating) wattage of the ARHCM and the associated desired running time for said output (heating) wattage. The prismatic power cells and alternative cylindrical cells are not parent/operator serviceable, and are actually completely embedded (sealed) within the construction of the Power Pack Controller Module 20. The user does not see or come into contact with the Lithium Ion Prismatic Pouch Cells 44 or alternative cylindrical cells (52,54) at any time as they are embedded within the sealed Power Pack Controller Module 20. The user is never required to manipulate or service these power cells in any way. The prismatic and cylindrical cells have a charging life cycle (number of separate charges) in excess of 3200 charges, whilst still maintaining an 88% initial capacity charge state. The charging life cycle allows for a minimum life expectancy in excess of eight (8) years with normal to high usage levels on a regular daily basis. An experienced electronic engineer, if so required could replace the power cells, although given the long charging life cycle this is an unlikely scenario. The cells are re-charged using the 'Charging Socket' as shown in FIG. 6. A mains voltage charger (110/120V-220/240V) or a vehicle charger (12V-24V) can be used to re-charge the cells. The cells can be fully charged in approximately 3 to 6 hours depending upon the remaining capacity in the cells prior to charging. The standard capacity, Amp hour (Ah) of the cells in the particular embodiment will also have an effect on charging time. An embodiment with higher capacity cells will take longer to recharge from the same depletion level than cells of a lower Ah capacity.

One embodiment sees the use of Nanophosphate Lithium Ion Prismatic Pouch Cells as depicted in FIG. 18. An alternative embodiment would be with the use of standard Lithium Ion Prismatic Pouch cells or cylindrical Lithium Ion cells (52 and 54) encased in a sealed slim-line case 47 made from ABS material (or similar type material) as depicted in FIG. 19. The operating temperature range of the Nanophosphate Lithium Ion Prismatic Pouch Cells is within the region of −30 degrees Celsius to +55 degrees Celsius. A possible alternative chemistry Prismatic Lithium Ion Pouch Cell that may be used is a "EXT Nanophosphate Lithium Ion" which handles extreme temperatures on both ends of the scale better, and thus has a better overall operating temperature range and performance. This "EXT" type cell could be implemented for use in extreme cold weather environments. The use of "EXT" type cell chemistry would improve both the voltage and current output, thus producing more heating output (wattage) and operate for a longer period of time between recharging cycles in colder operating conditions. The enhanced characteristics of "EXT" type cell chemistry offers around a 20% increase in power output over standard chemistry Nanophosphate Lithium Ion cells at the extremes of operating temperatures.

The Prismatic Lithium Ion Power Cell Discharge Curve as depicted in FIG. 16 shows the discharge characteristics at 0 degrees C. of the cell over an extended time period in the order of four and half hours. The extremely flat nature of this discharge curve, clearly demonstrates the benefits of this cell chemistry over standard Alkaline chemistry as shown in FIG. 17. The Prismatic Lithium Ion cell manages to maintain approximately 3.300 volts to 3.225 volts over virtually the complete discharge curve duration to around four and a half hours. This very flat curve enables a higher wattage (power) output from the ARHCM throughout its operating period. The output power being based on the standard formula of $P=V \times I$ (Power=Voltage×Amps). The cell chemistry also performs extremely well at lower operating temperatures than conventional chemistry. The EXT type chemistry also stated as an alternative embodiment performs even better at lower operating temperatures below 0 degrees C. than the standard Lithium Ion chemistry as noted above, offering around a twenty percent (20%) improvement on the standard non EXT chemistry version of the cell.

The choice of Lithium Ion chemistry over more conventional chemistry such as standard Alkaline chemistry can be seen by the FIG. 17. Alkaline chemistry has a much steeper discharge curve characteristic, thus the voltage output of the cell drops below 3.300 volts after only two hours running time. This much steeper discharge curve than that of Lithium Ion chemistry means that the power output of the ARHCM running on Alkaline chemistry would start to decrease in total output power ($P=V \times I$) shortly after two hours of running, and would continue to decrease over the remaining running period. Alkaline chemistry discharge curve also display steeper characteristics at higher operating temperatures than Lithium based chemistry, thus it does not perform well in lower ambient temperatures of 0 degrees C. and below. These factors contribute to the choice of Lithium Ion and other similar type chemistry over the more readily available Alkaline cell chemistry as a power pack choice for the ARHCM.

An alternative embodiment to the Prismatic Lithium Ion Pouch Cells 44 in FIG. 18, is to use similar cell chemistry but in cylindrical format (52 and 54) as shown in FIG. 19 as previously discussed. The cylindrical cells would be wired in series within the case and then sealed in a slim-line case 47 made from ABS material (or similar material), manufactured with a sealing top 147. The number of sealed cased cells wired in parallel will depend upon the required current output desired. One possible embodiment would be to have three cells encased together (series wiring inside case) and wired in parallel with each other (the sealed cases). Three cases (wired in parallel) of three cells which would then be wired in series to produce an average, "off-load" combined voltage in the region of 9.6 volts. The total Ah (Amp/hour) capacity in this configuration would be in the order of 3.3 Ah (3300 mAh). The individual cell dimension would be in the order of 65 mm in height (H) and 18 mm in diameter (D) (2.5 inches by 0.70 inches respectively). A suitable cell for this particular embodiment would be an A123 SYSTEMS "APR18650-m1A", this cell being of a Lithium Ion Nanophosphate type chemistry structure. Alternatively, if a higher amp hour rating was required the "APR18650m1A" cell could be substituted for the "ANR26650-m1" which would in the same configuration of three cells in parallel connected three times in series to produce the same "off-load" combined voltage of 9.6 volts but at a higher 6.9 Ah (6900 mAh) total capacity. Numerous other types of different cells (types and chemistry) from a variety of manufacturers exist which could be implemented in this or similar planned embodiment subject to the voltage and amp hour requirements required. A plurality of other cell compositions exists such as Nanophosphate Lithium Ion, Ext Nanophosphate Lithium Ion, Nickel Cadmium, Nickel-metal Hydride, Lithium Ion, Lithium Ion Polymer and Lithium Iron Phosphate. These alternative cell type compositions exist in a variety of formats such as prismatic pouches and cylindrical cell formats. The voltage and Ah of these alternative cells vary considerably and the choice of cell for any particular embodiment will depend upon a number of factors such as heating output required (wattage) and total running time, amongst other factors such as weight. The particular battery type and Ah rating chosen would be based on the average ambient temperature that the ARHCM would be required to operated within. The use of Ext Nanophosphate Lithium Ion chemistry would be particularly beneficial in countries with extremely severe weather, with temperatures dropping below 0 degrees C. on a regular basis such as Canada.

The ARHCM contains a plurality of low power digital temperature sensors such as Dallas DS18B20 with the unique "1-Wire" interface which are embedded within the Regionalised Heating Mat 1. The plurality of sensors are capable of individually reporting back to the microcontroller (within the Power Pack Controller Module 20) with an accuracy of + or −0.5 degree Celsius for each of the measured regions. The sensors have a temperature measuring range of −55 degree Celsius to +125 degree Celsius. The particular embodiment shown in the figures depicts six Dallas DS18B20 digital temperature sensors being used to report directly back to the Microcontroller via a "1-Wire" digital interface. The sensors are configured to obtain power via the data input/output pin in "Parasite" mode so as to avoid running additional power feeds to the individual sensors. Alternative digital temperature sensors such Texas Instruments TMP102 with "SMBus™/Two-Wire" Serial Interface, could be implemented in place of the aforementioned Dallas DS18B20 digital sensors. A variety of other digital temperature sensors could be implemented if required. The fundamental purpose of whichever type of digital temperature sensor is implemented is to accurately report to the microcontroller the temperature in the specific region being measured. The embodiment depicted in the figures demonstrates the use of six digital temperature sensors within three distinct regions, the head, main body and legs region as depicted in FIG. 4. A smaller or larger plurality of sensors and regions may be used dependant upon the particular embodiment and the desired level of accuracy and functionality required. A temperature sensors of the aforementioned type is also embedded within the Power Transfer Lead 21 as depicted in FIG. 7. This temperature sensors reports back to the microcontroller (within the Power Pack Controller Module 20) the ambient temperature of the environment within which the ARHCM is currently operating. The Power Transfer Lead 21 is used to connect (transfer) energy between the Power Pack/Controller Module 20 and the Regionalised Heating Mat.

The Microcontroller in the Power Pack Controller Module 20 monitors the temperature from each regional sensors (15, 16, 13, 4, 11 and 9) approximately once every second. The sensors each have a unique serial number that is used to identify the particular regional sensor when the temperature data is read via the "1-Wire" serial interface into the Microcontroller. This enables the Microcontroller to adjust the individual output levels to the MOSFETs in order to automatically regulate the heating channels in such a manner to accurately establish the temperature as set by the parent/operator on the mobile telephone 41, laptop/pc/tablet/iPad® 43 or remotely via an operator obtaining access to the ARHCM via the wireless router 42 connected to the internet (wide area network) or local network as depicted in FIG. 15. The temperature readings obtained from the plurality of sensors can be reported back to the parent/operator via the bidirectional WiFi®/Bluetooth® Module that is embedded and interfaced to the Embedded Wireless Microcontroller located within the Power Pack Controller Module 20. The temperature could then be displayed either numerically or graphically on the mobile telephone 41, laptop/pc/tablet/iPad® 43 or transmitted via the wireless router 41 connected to the Internet or local network. Accurate measuring and reporting of regional (head, main body and legs) temperatures throughout the autonomous heated child's blanket system is of paramount importance to control and balance the temperatures of the system by utilising the received temperature data to control the Primary and Secondary regional heating channels within each of the regions individually. The system will also allow balanced temperatures throughout the plurality of individual regions. The Microcontroller may also be programmed to balance the temperatures between the individual regions. The advanced temperature monitoring and controls enables the individual regions to be maintained within a tolerance of +/−1 degree C. of each other at all times if required.

The parent/operator can either set a uniform temperature throughout the regions (head, main body and legs) or set different temperatures in the regions. The parent/operator may decide to set the head region at twenty (20) degrees C., whilst setting the main body and legs region at twenty-four (24) degrees C. The Microcontroller with the temperature information it receives from the regional digital temperature sensors (15, 16, 13, 4, 11 and 9) is able to accurately maintain these temperature differentials. The particular embodiment with two digital temperature sensors in each region as shown (15-16, 13-4, 11-9), is able to detect if the child has removed his/her top blanket covering on one side by a measured temperature differential. A noted temperature differential can be reported to the parent/operator via the bidirectional WiFi®/Bluetooth® communication link between the Power Pack Controller Module 20 and the device (mobile 41, router 42, laptop/pc/tablet/iPad® 43) being used to control the ARHCM. The system offers a high degree of flexibility in terms of remote heating controllability and monitoring via the bidirectional WiFi®/Bluetooth® communication link. The digital temperature sensors within the regionalised heated mat 1 and the ambient temperature sensors ensure a high degree of accuracy, controllability, uniformity and repeatability. The ambient digital temperature sensor also enables the system to be able to quickly detect if the system has been taken into a warmer environment and thus it will need to quickly adjust the heating channel outputs in order to maintain its set temperatures; without exceeding its set temperatures due to the quick rise in ambient temperature. The system continues to monitor all set temperatures and ambient temperatures so that if the ambient temperature suddenly drops again quickly, the heating channel outputs can be quickly increased to compensate as necessary. The rise and then subsequent fall in detected ambient temperature would occur if the ARHCM was taken from outside in cold weather into a warm shop and then taken back out again of the warm shop. The digital temperature monitoring system is able to detect and respond quickly to changes like the shop example given above. The ambient digital temperature sensor located in the Power Transfer Lead with Embedded Digital Temperature Sensor 21, can detect changes in ambient temperature within a time period of only two or three seconds, and report this to the Microcontroller located within the Power Pack Controller Module.

The Power Pack Controller Module 20 has an embedded 8-Bit Low Power Microcontroller within its structure. Alternative Microcontrollers such as 4-Bit and 16-Bit could be implemented if required. The Microcontroller incorporates on-board system memory that contains custom written code for the precise control and monitoring of the heating system. The Microcontroller is interfaced to a WiFi®/Bluetooth® controller module via an UART interface or alternative interface such as I2C® (Wire) or a plurality of other types of available interfaces available on the embedded Microcontroller. The WiFi® module is a complete ultra low power embedded TCP/IP solution. The module offers stand alone embedded wireless 802.11 b/g/n networking. The module incorporates its own 2.4 GHz radio, processor, TCP/IP stack, real-time clock and UART (Universal Asynchronous Receiver Transmitter) interface. The WiFi®/Bluetooth® module allows the ARHCM to be controlled from any device having a wireless connection and web browser or appropriate operating system with suitable Application (App with Serial data connection or similar communication protocol). A mobile phone 41 with WiFi® or a Laptop (computer/tablet/iPad®) 43 with WiFi® can easily be used to operate the ARHCM with ease. The wireless router 42, which may be connected to the Internet will allow for a remote operator to monitor, configure and operate the ARHCM from a remote location (WAN) or a local location via a local area network (LAN).

The router 42 connection, either locally (LAN—Local Area Network) or via the internet remotely (WAN—Wide Are Network) will allow the system a large degree of control flexibility. The system could if situated within the proximity of a router 42 connected to the internet (WAN) allow the parent/operator to review and control the system from a remote location via an internet connected mobile telephone 40 using either a dedicated Application (App) or a Web browser. The parent/operator from a remote location, such as a restaurant or friend's house could monitor and control the child's temperature all with the simple click of a button on his/her mobile telephone 40 or laptop/pc/tablet/iPad® 43. This has a number of potential medical benefits, as the system could be used within a hospital to monitor and control the temperature for children with illnesses that require them to be kept stable at a particular temperature and monitored.

The ARHCM produces a highly consistent and uniform level of heat output (wattage) throughout the Regionalised Heating Mat 1. The particular embodiment depicted has a plurality of heating regions (head, main body and legs) to ensure equal distribution of heating throughout the regions. The system incorporates both Primary and Secondary heating channels for each region. The Microcontroller monitors and controls (cycles) the Primary and Secondary channels in an automatic manner relative to the requirements the parent/operator has selected via the wireless WiFi®/Bluetooth® controller (possibly mobile telephone 41, remote operator via wireless internet connected router 42 and/or laptop/pc/tablet/iPad® 43). The desired heat output and hence level can be chosen and set either by utilising the web browser on the mobile telephone 41 or laptop/personal computer 43 (including tablet/iPad®) or by the use of a dedicated application on the mobile 41 or laptop/pc/tablet/iPad® 43 as required. The system is designed to operate currently with both IOS®, Android® devices and should be able to be functional with future similar devices that operate on Wireless and/or Bluetooth® protocols using similar operating systems and platforms.

The embodiment has both Primary and Secondary heating channels for all the regions. The fundamental purpose of the Primary and Secondary heating channels is to ensure a complete redundancy facility should either of the channels fail on a temporary or permanent basis whilst operating. The Primary and Secondary channels are individually controlled by separate MOSFET's that are driven and monitored directly from the Wireless Microcontroller. The software (firmware) stored in the Microcontroller monitors on a regular time basis, approximately once every second the current level being drawn by each of the individual heating channels in each of the regions, Primary and Secondary on an individual basis using a highly accurate "Hall" effect type sensor, with the output being logged by the Microcontroller. The Microcontroller immediately reports to the parent/operator if any one or more heating channels have failed or it has detected an operating anomaly in the previous operating period. The reporting of the failure is accomplished through the WiFi®'s/Bluetooth®'s bidirectional data transfer to the mobile telephone 41, wireless router 42 or laptop/pc/tablet/iPad® 43 that the parent/operator is using to control the system. The system is also programmed to automatically increase the heating output (duty-cycle) of the remaining channel in the region for which the other channel has failed in an attempt to maintain the previous heating output. The following situation demonstrates the above; if in one of the regions the Secondary channel has failed and prior to the failure occurring the heating level in that region for both channels was being controlled at a 50% duty-cycle on each channel, then the system would automatically increase the duty-cycle on the remaining channel (Primary) to 100% duty-cycle in order to obtain a similar level of heating output (wattage). The system would continue to monitor the failed channel and the remaining channels so that should the situation change in any way the Microcontroller can take the appropriate action to attempt to maintain the set and desired heating level. The Microcontroller can be considered to be intelligent in the manner in which it continually monitors and updates the heating duty-cycles of the regions for both the Primary and Secondary channels. The Primary and Secondary heating channels are at all times driven independently of each other to maximise control efficiency. FIGS. 11 and 12 demonstrate the failure of the Primary Channel and then the subsequent alteration (increase) of duty-cycle on the remaining Secondary Channel.

The invention claimed is:

1. A mobile autonomous heated child's mat comprising:
   a semi-pliable felt fabric mat structure;
   a plurality of regionalized electrical heating patterned pairs that are configured to be capable of individual control and isolation from each other are embedded and fixed to the mat structure in a plurality of separate regions so as to allow independent distributional heat control and output to a head region, a main body region and leg regions;
   a power pack controller module embedded in said mat structure, said power pack controller module having an encased rechargeable power cell; an embedded wireless microcontroller permanently affixed to the mat structure and coupled to said power cell, and an embedded MOSFET heating circuit controller, said microcontroller having a wireless bi-directional transmission control and internet connectivity interfaces which utilizes wireless 802.11b/g/n/Bluetooth networking, said microcontroller connected to the plurality of regionalized electrical heating patterned pairs via said embedded MOSFET heating circuit controller, said embedded MOSFET heating circuit controller having two individually generated pulse width modulation outputs per pair of regionalized electrical heating patterned pairs for monitoring and controlling said separate regions individually or in combination thereof, wherein each one of said plurality of regionalized electrical heating patterned pairs is independently controlled with a directly adjacent regionalized electrical heating patterned pair so as to offer a complete redundancy failure system, adjacent heating patterned pairs of said plurality of regionalized electrical heating patterned pairs are operated totally independently with primary and secondary pairs of said plurality of regionalized electrical heating patterned pairs so as to allow independent control between said primary and secondary pairs;

a plurality of embedded digital temperature sensors affixed to the mat structure and located within said heating patterned pairs of each of the corresponding head, main body and legs regions of said separate regions to sense heating outputs of primary and secondary pairs, said sensors are digitally interfaced and relayed to the embedded microcontroller by embedded MOSFET heating controller;

a power transfer lead with an embedded digital temperature sensor coupled between said mat structure and said power pack controller;

wherein said heating outputs are wirelessly and individually monitored and controlled based on temperatures received from said digital temperature sensors and temperatures set by an user.

2. The mobile autonomous heated child's mat as in claim 1, wherein said autonomous heated child's mat is configured to enable the embedded wireless microcontroller to be controlled and bi-directional communications established from a mobile phone, laptop, computer, tablet or iPad®.

3. The mobile autonomous heated child's mat as in claim 1, wherein said autonomous heated child's mat is configured within a child's pushchair.

4. The mobile autonomous heated child's mat as claim 1, wherein said autonomous heated child's mat is configured within a child's stroller.

5. The mobile autonomous heated child's mat as in claim 1, wherein said autonomous heated child's mat is configured within a child's buggy.

6. The mobile autonomous heated child's mat as in claim 1, wherein said autonomous heated child's mat is configured within a child's carriage.

7. The mobile autonomous heated child's mat as in claim 1, wherein said autonomous heated child's mat is configured within a child's car seat.

8. The mobile autonomous heated child's mat as in claim 1, wherein said autonomous heated child's mat is configured within a child's pram.

9. The mobile autonomous heated child's mat as in claim 1, wherein said autonomous heated child's mat is configured within a child's conveyance.

\* \* \* \* \*